United States Patent [19]

Inoue

[11] Patent Number: 4,551,606
[45] Date of Patent: Nov. 5, 1985

[54] BEAMED ENERGY RADIATION CONTROL METHOD AND APPARATUS

[75] Inventor: Kiyoshi Inoue, Tokyo, Japan

[73] Assignee: Inoue-Japax Research Incorporated, Yokohama, Japan

[21] Appl. No.: 498,177

[22] Filed: May 26, 1983

[51] Int. Cl.[4] .................. B23K 15/00; B23K 26/00
[52] U.S. Cl. .................. 219/121 EA; 219/121 EM; 219/121 LA; 219/121 PT; 250/492.3
[58] Field of Search .................. 219/121 EA, 121 EM, 219/121 EB, 121 EG, 121 EK, 121 ER, 121 LA, 121 LB, 121 LL, 121 LK, 121 LC, 121 LD, 121 LG, 121 LN, 121 P, 121 PT; 315/307; 250/492.2, 492.3

[56] References Cited

U.S. PATENT DOCUMENTS

| | | | |
|---|---|---|---|
| 3,875,366 | 4/1975 | Von Walter | 219/121 EA X |
| 3,909,663 | 9/1975 | Thomas et al. | 219/121 EA X |
| 4,045,707 | 8/1977 | Gernot et al. | 219/121 EA X |
| 4,087,672 | 5/1978 | Yi | 219/121 EA X |
| 4,219,720 | 8/1980 | Moench | 219/121 EM |
| 4,314,182 | 2/1982 | Thomas et al. | 315/307 |

FOREIGN PATENT DOCUMENTS

| | | |
|---|---|---|
| 2153695 | 5/1973 | Fed. Rep. of Germany . |
| 2336223 | 2/1975 | Fed. Rep. of Germany ...... 219/121 EA |
| 2541943 | 3/1977 | Fed. Rep. of Germany . |
| 159614 | 3/1983 | German Democratic Rep. ............. 219/121 EA |
| 57-1587 | 1/1982 | Japan ............. 219/121 EA |

OTHER PUBLICATIONS

Lyman et al., Metals Handbook, "Welding & Brazing", 8th Ed., vol. 6, 2nd Printing 1974, pp. 547-549.

*Primary Examiner*—C. L. Albritton
*Assistant Examiner*—Alfred S. Keve
*Attorney, Agent, or Firm*—Owen, Wickersham & Erickson

[57] ABSTRACT

A method of and apparatus for controlling beamed energy radiation, e.g. of electron beams, onto a workpiece making use of a beam gun for producing a series of successive, time-spaced groups of pulsed energy beams. A power supply for the beam gun is constructed to produce a series of successive, time-spaced groups of discrete, time-spaced electrical pulses to produce the series of the successive, time-spaced groups of the pulsed energy beams. A highly precise, subtle control of the energy flow of the beamed radiation onto the workpiece is achieved in this manner by controlling the time duration $\tau on$ and the time interval $\tau off$ of the electrical pulses, the time duration $Ton$ and the time interval $Toff$ of the groups and the number $n$ of the electrical pulses in each of the groups.

10 Claims, 7 Drawing Figures

4,551,606

BEAMED ENERGY RADIATION CONTROL METHOD AND APPARATUS

FIELD OF THE INVENTION

The present invention relates to energy beam control and, more particularly, to a new and improved method of and apparatus for the control of beamed energy radiation for use in welding, cutting, drilling, heat-treatment or other machining or material processing operations as well as in measurements.

BACKGROUND OF THE INVENTION

In recent times there have been increasingly widespread uses of energy beams, e.g. electron beams, ion beams, plasma beams or laser beams in the field of machining, processing and measurement arts.

In these applications it has become apparent that it is desirable to pulse beamed energy radiation and also to control the energy flow being radiated onto a workpiece precisely, depending upon the particular operation to be performed thereon. While various control devices have hitherto been proposed and put into practical use for a beam gun and a power supply therefor, these devices have been found to be either highly sophisticated in structure or unsatisfactory in precisely controlling the energy flow onto the workpiece in a particular mode as desired.

OBJECTS OF THE INVENTION

The present invention seeks to provide a novel and improved method which is capable of precisely controlling beamed energy onto a workpiece in a particular mode in a beam radiation system and also to provide a novel and improved beam radiation control apparatus which is relatively simple in construction and capable of the precision-control of the beamed energy flow in any particular mode as desired.

SUMMARY OF THE INVENTION

In accordance with the present invention, in one aspect thereof, there is provided a method of controlling a beamed energy radiation onto a workpiece, which method comprises: producing a beamed energy flow in the form of a series of successive, time-spaced groups of pulsed energy beams for irradiation of the workpiece; and controlling the beamed energy flow being radiated onto the workpiece by controlling at least one of the parameters of the pulsed energy beams including the time duration $\tau on$ of the pulsed energy beams, the time interval $\tau off$ between the successive energy beams, the time duration Ton of the groups, the time interval Toff between the successive groups and the number n of the pulsed energy beams in each of the groups.

The present invention also provides, in another aspect thereof, an apparatus for controlling beamed energy radiation onto a workpiece, which apparatus comprises: a beam gun for producing a beamed energy flow; a power supply operatively connected to the beam gun for producing the beamed energy flow in the form of a series of successive, time-spaced groups of pulsed energy beams for irradiation of the workpiece; and setting means associated with the power supply for selecting respective preset values of parameters including: the time duration $\tau on$ of the pulsed energy beams, the time interval $\tau off$ between the successive pulsed energy beams, the time duration Ton of the groups, the time interval Toff between the successive groups, and the number n of the pulsed energy beams in each of the said groups.

The invention also provides, in a further aspect thereof, a method of controlling a beamed energy radiation onto a workpiece from a beam gun, comprising: energizing the beam gun by a power supply to produce a series of pulsed energy beams for irradiation of the workpiece; producing in the power supply a series of successive, time-spaced groups of discrete, time-spaced electrical pulses to produce the series of pulsed energy beams from the beam gun; and controlling the energy flow by the pulsed energy beams onto the workpiece by controlling at least one of the time duration $\tau on$ of the electrical pulses, the time interval $\tau off$ between the successive electrical pulses, the time duration Ton of the groups, the time interval Toff between the successive groups and the number n of the electrical pulses in each of the groups.

The invention also provides, in still another aspect thereof, an apparatus for controlling beamed energy radiation onto a workpiece, which apparatus comprises: a beam gun for producing a series of pulsed energy beams for irradiation of the workpiece; a power supply operatively associated with the beam gun for producing therein a series of successive, time-spaced groups of discrete, time-spaced electrical pulses to produce a series of pulsed energy beams from the beam gun; and means for controlling at least one of the time duration $\tau on$ of the electrical pulses, the time interval $\tau off$ between the successive electrical pulses, the time duration $\tau off$ between the successive electrical pulses, the time duration Ton of the groups and the time interval Toff between the successive groups and the number n of the electrical pulses in each of the groups, thereby controlling the energy flow by the pulsed energy beams onto the workpiece.

BRIEF DESCRIPTION OF THE DRAWING

These and other features of the present invention as well as advantages thereof will become more readily apparent from a reading of the following description of certain embodiments thereof when taken with reference to the accompanying drawing in which.

SPECIFIC DESCRIPTION

Figure 1:
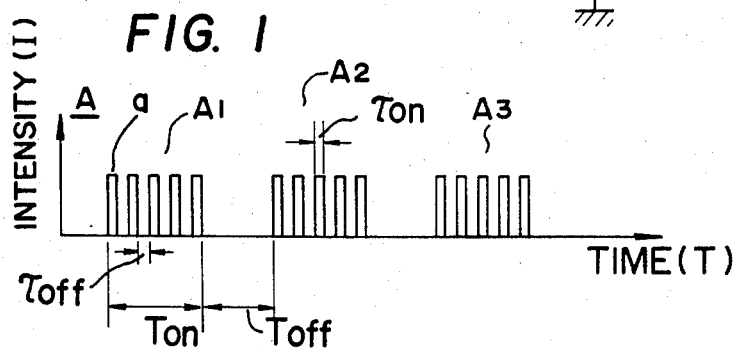
FIG. 1 is a format diagrammatically illustrating a basic form of a series of successive, time-spaced groups of pulsed energy beams for use in the present invention.

Referring now to FIG. 1, there is shown a series of successive time-spaced groups of pulsed, time-spaced energy beams A according to the present invention. Three groups or trains in the series A are shown and designated by A1, A2 and A3. The groups, A1, A2, A3

... are shown as having a duration Ton and a time interval Toff between successive groups. Each group A1, A2, A3, ... consists of an n number of time-spaced pulsed beams a which are shown as having a duration τon and a time interval τoff. The pulsed energy beams a may be beams of electrons, ions, molecules, or plasma or other composite particles, or a laser. It is seen that all beams a in each groups have an equal or uniform intensity and it should be noted that at least a majority of pulsed beams a in each group A1, A2, A3, ... should advantageously have an equal intensity I. In some energy beam operations, it is desirable that the first one or more pulsed beams a in each group A1, A2, A3, ... have an intensity either greater or smaller than the remainder therein.

Figure 2:
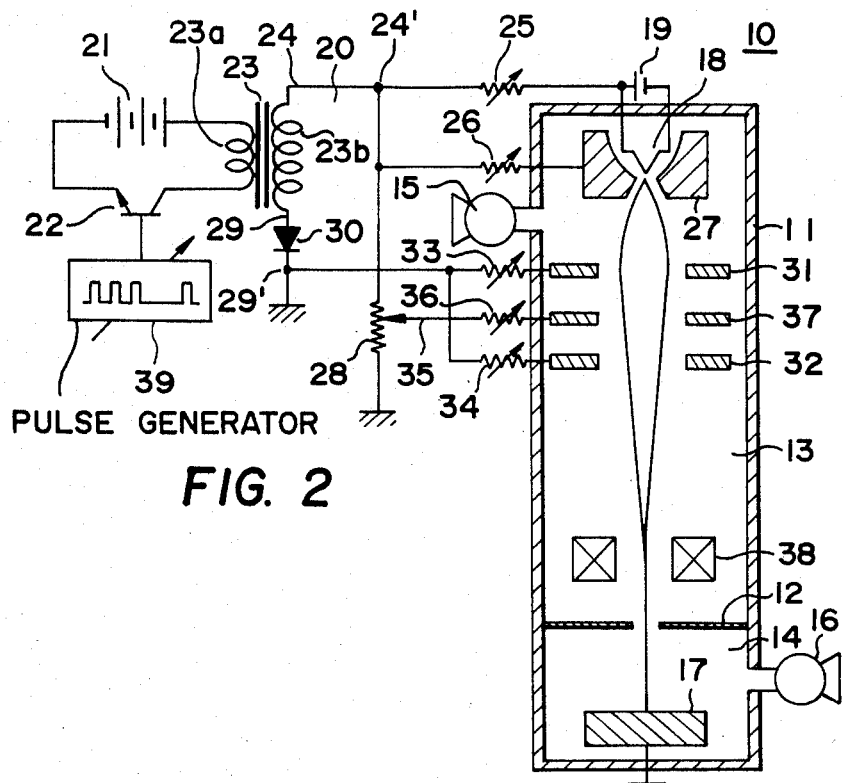
FIG. 2 is a schematic representation diagrammatically illustrating one form of the apparatus according to the present invention.

In FIG. 2, there is shown an electron beam system 10 which embodies the present invention. The system 10 comprises an evacuated housing 11 which is divided by an apertured partition 12 into two chambers 13 and 14. These chambers are evacuated by vacuum pumps 15 and 16, respectively. In the lower chamber 14 there is disposed a workpiece 17 for irradiation by a series (A) of time-spaced groups (A1, A2, A3, ...) of time-spaced, pulsed energetic electron beams a as shown in FIG. 1. The workpiece 17 is shown as grounded. The workpiece 17 may here be drilled, for instance.

Within the upper chamber 13 at a top end thereof there is provided a source of electrons constituted by a filament 18 and a DC supply 19. The filament 18 is heated by the DC supply 19 to emit electrons. The emitted electrons are controlledly extracted and accelerated by a novel power supply 20 to produce a series A of groups of time-spaced, pulsed energetic electron beams a according to the present invention.

The power supply 20 comprises a DC source 21 connected in series with a switch 22 to the primary windings 23a of a step-up transformer 23. The secondary winding 23b of the transformer 23 has one terminal 24 connected via a resistor 25 to the filament electrode 18 and also via a resistor 26 to a Wehnelt electrode 27. The junction 24' of the resistors 25 and 26 is connected via a resistor 28 to ground. The other terminal 29 of the secondary winding 23b of the transformer 23 is also grounded via a diode 30 oriented as shown. The junction 29' of the negative pole of the diode 30 and ground is connected to acceleration electrodes 31 and 32 via resistors 33 and 34, respectively. The resistor 28 is tapped by an adjustable arm 35 which is connected via a resistor 36 to an electrostatic lens electrode 37 disposed between the acceleration electrodes 31 and 32 within the upper chamber 13. In the region of the lower end of the upper chamber 13 there is disposed a beam-focusing coil 38 energized by a power supply (not shown). The switch 22 in the primary side of the transformer 23 is alternately turned on and off by a pulse generator 39 to the output of the DC source 21.

The pulse generator 39 is designed to provide a series of successive, time-spaced groups or trains of discrete, time-spaced signal pulses of a waveform as shown in FIG. 1 to develop such a series of groups or trains of pulses at the primary winding 23a of the transformer 23. This will cause a series of successive, time-spaced groups or trains of discrete, time-spaced output pulses of a voltage stepped up to a predetermined value to develop across the junctions 29' and 24'. By adjusting the signal pulses at the pulse generator 39, these output voltage pulses a are controlled to have a predetermined duration τon and a predetermined time τoff. The successive groups or trains A1, A2, A3, ... are controlled to have a predetermined duration Ton and a predetermined time interval or cut-off time Toff. The number n of pulses a in each group A1, A2, A3, ... is also controlled. The controlled output voltage pulses are applied between the Wehnelt electrode 27 and the filament electrode 18 and also between the acceleration electrodes 32 and 31, and the Wehnelt electrode 27 so that there are produced in the chamber 13 pulsed energetic electron beams in the form of a series A of successive, time-spaced groups or trains A1, A2, A3, ... of pulsed beams a as shown in FIG. 1. The pulsed beams a in each group or train A1, A2, A3, ... have a controlled duration τon and a controlled time interval τoff. The groups or trains A1, A2, A3, ... in the series A have a controlled duration Ton and a controlled time-interval or cut-off time Toff. Each group or train A1, A2, A3, ... has a controlled number n of pulsed beams a. The individual pulsed beam produced is focused through the coil 38 to result in a narrow beam of a controlled diameter which impinges on the workpiece 17 in the chamber 14. The intensity of each pulsed beam is preset through the adjustment of the resistors 25, 26, 28, 33, 34, 36.

Figure 3:
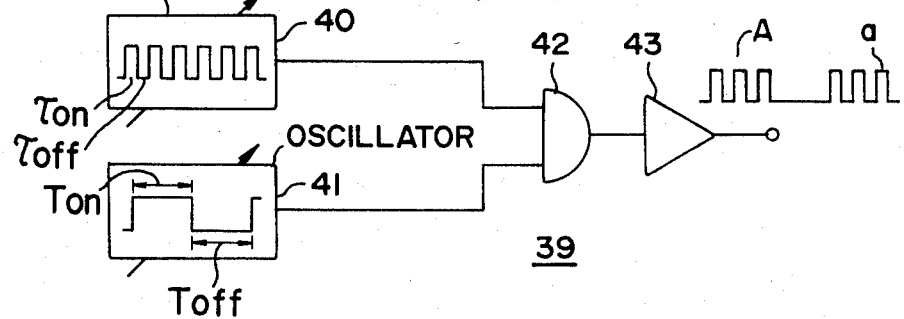
FIGS. 3–5 are circuit diagrams illustrating different embodiments of the signal pulse generator for use in a power supply for a beam gun of the apparatus in accordance with the present invention.

The pulse generator 39 may be constructed in the form shown in FIG. 3. The pulse generator there shown includes two oscillators 40 and 41. The oscillator 40 produces a series of discrete, time-spaced narrow pulses a of an adjustable frequency f as well as a duration τon and an interval τoff which are adjustable independently of each other. The oscillator 41 produces a series of time-spaced wider pulses A of an adjustable frequency F as well as an on-time Ton and an off-time Toff which are adjustable independently of each other. The outputs of the oscillators 40 and 41 are combined by an AND gate 42 which thus issues through an amplifier 43 a series of successive, time-spaced group or trains A of discrete, time-spaced pulses a having controlled parameters τon, τoff, Ton, Toff, n. The oscillators 40 and 41 may each be constituted by an astable multivibrator of conventional design.

Figure 4:
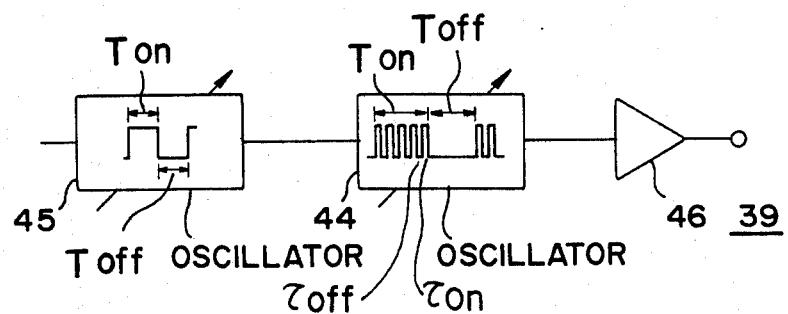

An alternative form of the construction of the pulse generator 39 shown in FIG. 4 makes use of the series connection of two oscillators 44 and 45. The oscillator 44 operates at adjustable frequency f to provide switching pulses of adjustable duration τon and interval τoff which are applied via an amplifier 46 to the switch 22 (FIG. 2). The oscillator 45 operates at an adjustable frequency F which is lower than the frequency f of the oscillator 44 to provide control pulses of adjustable on-time Ton and off-time Toff which are applied to the oscillator 44. Accordingly, the switch 22 is operated to turn on and off the DC source 21 (FIG. 2) and provides across the primary winding 23a and hence across the junctions 29' and 24' the series A of successive groups or trains of voltage pulses a having controlled parameters τon, τoff, Ton, Toff and n. As in FIG. 3, the oscillators 44 may each be constituted by an astable multivibrator of conventional design.

Figure 5:
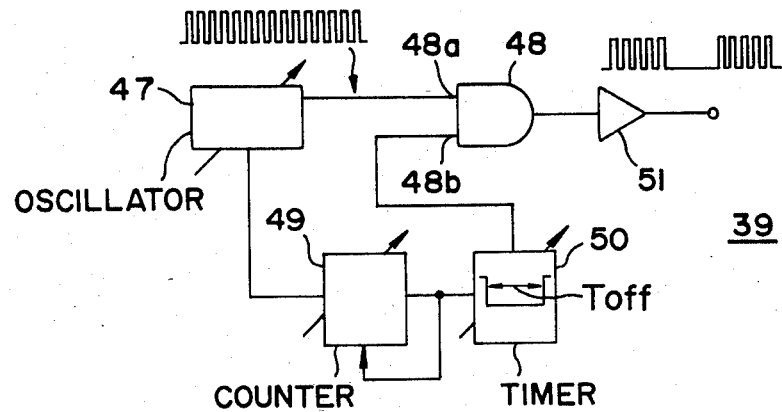

FIG. 5 shows another form of the pulse generator 39 which may be employed. In this embodiment, an oscillator 47, e.g. an astable multivibrator, furnishes a uniform series of signal pulses a to an AND gate 48 through the latter's first input terminal 48a. The oscillator 47 has an additional output fed to a counter 49 which is adapted to count an adjustable preset number n of output pulses from the oscillator 47, which number determines the time duration Ton. The counter 49 upon the counting is reset while issuing a trigger signal which is applied to activate a timer 50, e.g. a monostable multivibrator, which determines an adjustable time Toff for groups or trains A1, A2, A3, . . . . When actuated, the timer 50 provides an "inhibit" signal to disable the AND gate 48 to pass, and to interrupt, the pulses a to an amplifier 51. The timer 50, upon termination of the time Toff, provides an "enable" signal to the other AND gate input terminal 48b to permit the AND gate 48 to pass the pulses a to the amplifier 51. Thus, in this embodiment as well, it will be seen a series A of successive, time-spaced groups A1, A2, A3, . . . of discrete, time-spaced signal pulses a of adjustable parameters $\tau$on, $\tau$off, Ton, Toff, n is applied to the switch 22.

Figure 6:
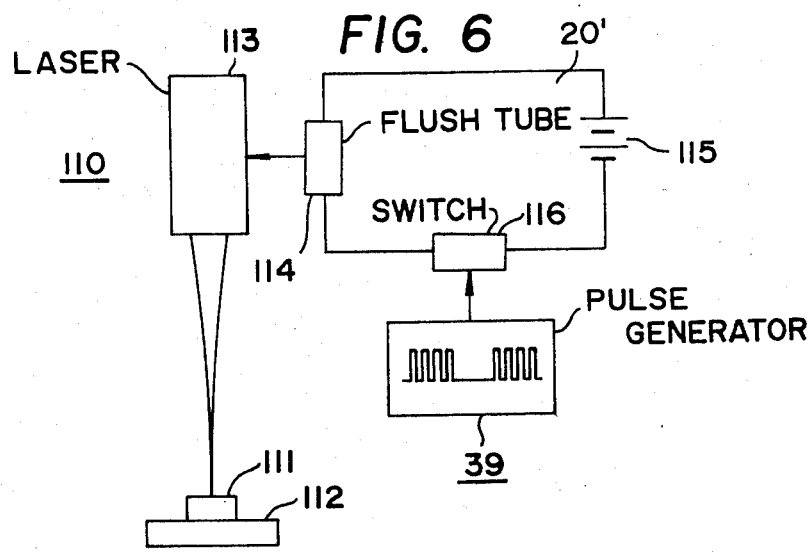
FIG. 6 is a schematic representation diagrammatically illustrating another embodiment of the apparatus according to the present invention.

FIG. 6 shows another embodiment of the present invention, as applied to a laser system 110, e.g. for machining a workpiece 111 mounted on a worktable 112. A laser gun 113 is pumped or actuated by a flush tube 114 to produce a laser beam which is trained towards the workpiece 111. The flush tube 114 is energized by a DC supply 115 which is connected thereto in series with a power switch 116. The latter is turned on and off in response to signal pulses furnished by a pulse generator 39, which may be of any one of the constructions shown in FIGS. 3–5, to flush the tube 114 pulsively and in turn cause the gun 113 to generate pulsed laser beams in the form of a series A of successive, time-spaced groups or trains A1, A2, A3, . . . of discrete, time-spaced laser beams a (FIG. 1) which are directed to impinge a given narrow spot on the workpiece 111 supported by the worktable 112.

Figure 7:
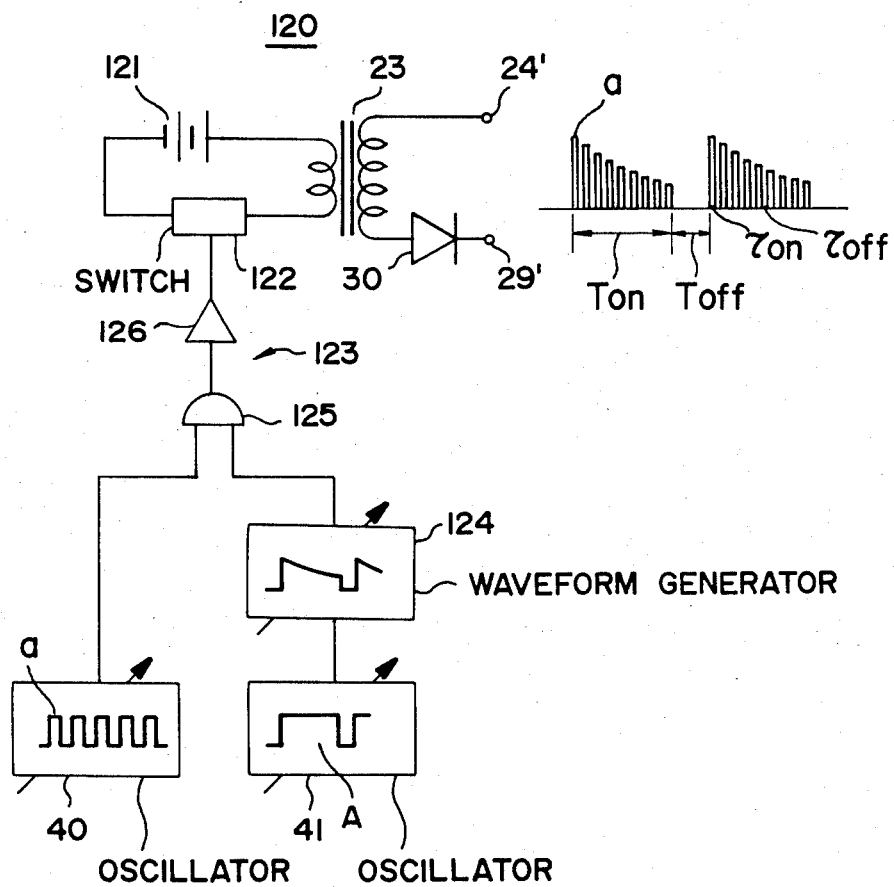
FIG. 7 is another form of the power supply for the beam gun of the apparatus according to the present invention.

FIG. 7 shows another embodiment of the power supply 20 for energizing a beam-gun system as previously described. The power supply 20 in this embodiment includes, as in the arrangement of FIG. 2, a step-up transformer 23 having output terminals 24' and 29' at its secondary side with a diode 30 being connected as shown. The primary winding of the transformer 23 is connected in series with a DC source 121 and a switch 122 which is designed to form a variable resistor which provides at the transformer 23 a voltage output whose magnitude is proportional to a control input signal applied thereto from a pulse generator 123. The pulse generator 123 here again includes two oscillators 40 and 41, as previously described, which provide a uniform series of narrow adjustable pulses a and a uniform succession of adjustable wider pulses A. In this embodiment, however, a waveform generating circuit 124 adapted to provide a variable lump voltage waveform in response to the leading edge of each of the pulses produced in the oscillator 41, and also to respond to the trailing edge thereof to terminate the produced lump voltage. The outputs of the oscillator 40 and the waveformgenerating circuit 124 are tied at a gate 125 whose output is fed via an amplifier 126 to the switch 122. As a result, there develops a series of composite pulses across the output terminals 24' and 29' of the power supply 120, each of the composite pulses having an envelope waveform determined by the circuit 124 and being composed of discrete, short-duration pulses a. The beam gun system can be energized by the developed series of these composite pulses to produce a corresponding series of pulsed energy beams for irradiation of a workpiece.

What is claimed is:

1. A method of controlling beamed energy radiation onto a workpiece, comprising:
    producing a beamed energy flow in the form of a series of successive, time-spaced beam groups each of which groups comprises a succession of time-spaced energy beams with a beam on-time $\tau$on and a beam off-time $\tau$off for irradiation of the workpiece, said successive beam groups having each individually a time duration Ton and being separated by a time interval Toff which is greater than said beam off-time $\tau$off; and
    controlling said beamed energy flow being radiated onto the workpiece by controlling at least one of said on-time $\tau$on, said off-time $\tau$off, said time duration Ton, said time interval Toff and the number n of the time-spaced energy beams in each of said successive groups.

2. The method defined in claim 1 wherein at least a majority of the energy beams in each of said groups has a uniform intensity.

3. An apparatus for controlling beamed energy radiation onto a workpiece, comprising:
    a beam gun for producing a beamed energy flow;
    a power supply operatively connected to said beam gun for producing said beamed energy flow in the form of a series of successive, time-spaced beam groups each of which comprises a succession of time-spaced energy beams with a beam on-time $\tau$on and a beam off-time $\tau$off for irradiation of the workpiece, said successive beam groups being separated by a time interval Toff and each having individually a time duration Ton; and
    a plurality of setting means associated with said power supply for presetting said on-time $\tau$on, said off-time $\tau$off, said time duration Ton, said time interval Toff and the number n of the time-spaced energy beams in each of said successive beam groups.

4. The apparatus defined in claim 3, further comprising further setting means for presetting the intensity of each of said time-spaced energy beams in each of said successive beam groups at a predetermined value.

5. A method of controlling beamed energy radiation onto a workpiece from a beam gun, comprising:
    energizing said beam gun by a power supply to produce a series of pulsed energy beams for irradiation of the workpiece;
    producing in said power supply a series of successive, time-spaced pulse trains each of which comprises a succession of discrete, time-spaced electrical pulses having a pulse on-time $\tau$on and a pulse off-time $\tau$off, said successive trains having each individually a time duration Ton and being separated by a time interval Toff which is greater than said pulse off-time $\tau$off; and
    controlling energy flow by said pulsed energy beams onto the workpiece by controlling at least one of said pulse on-time $\tau$on, said pulse off-time $\tau$off, said time duration Ton, said time interval Toff and the number n of said discrete, time-spaced electrical pulses in each of said successive groups.

6. The method defined in claim 5 wherein at least a majority of said electrical pulses in each of said groups have a predetermined uniform magnitude.

7. The method defined in claim 5, further comprising: changing the magnitude of said electrical pulses in each of said groups in a predetermined format to give each of said pulsed beams a corresponding format of time-intensity characteristic.

8. An apparatus for controlling beamed energy radiation onto a workpiece comprising:

a beam gun for producing a series of pulsed energy beams for irradiation of the workpiece;

a power supply operatively associated with said beam gun for producing therein a series of successive, time-spaced pulse trains each of which comprises a succession of discrete, time-spaced electrical pulses having a pulse on-time $\tau on$ and a pulse off-time $\tau off$, said successive trains having each individually a time duration Ton and being separated by a time interval Toff which is greater than said pulse off-time $\tau off$; and means for controlling at least one of said pulse on-time $\tau on$, said pulse off-time $\tau off$, said time duration Ton and said time interval Toff and the number n of said discrete, time-spaced electrical pulses in each said successive groups, thereby controlling energy flow by said pulsed energy beams onto the workpiece.

9. The apparatus defined in claim 8, further comprising means for controlling the magnitude of said electrical pulses.

10. The apparatus defined in claim 9 wherein said magnitude-control means is adapted to change the magnitude of the electrical pulses in each of said groups in a predetermined format of time-magnitude characteristic to impart to each of said pulsed energy beams a corresponding format of time-intensity characteristics.

* * * * *